(12) United States Patent
Dallas

(10) Patent No.: US 11,390,347 B2
(45) Date of Patent: Jul. 19, 2022

(54) BIKE WARNING SYSTEM

(71) Applicant: Wade Dallas, East Palatka, FL (US)

(72) Inventor: Wade Dallas, East Palatka, FL (US)

( * ) Notice: Subject to any disclaimer, the term of this patent is extended or adjusted under 35 U.S.C. 154(b) by 323 days.

(21) Appl. No.: 16/881,284

(22) Filed: May 22, 2020

(65) Prior Publication Data

US 2021/0362796 A1 Nov. 25, 2021

(51) Int. Cl.
*B62J 50/25* (2020.01)
*B62J 11/00* (2020.01)
*B62J 27/00* (2020.01)

(52) U.S. Cl.
CPC .............. *B62J 50/25* (2020.02); *B62J 11/00* (2013.01); *B62J 27/00* (2013.01)

(58) Field of Classification Search
CPC ... B62J 50/25; B62J 11/00; B62J 27/00; B62J 6/04; B62J 6/22
See application file for complete search history.

(56) References Cited

U.S. PATENT DOCUMENTS

| | | | |
|---|---|---|---|
| 3,901,534 A * | 8/1975 | Popken | B62J 7/04 224/415 |
| 3,967,575 A | 7/1976 | Coutts | |
| 4,038,935 A * | 8/1977 | Margiloff | B60Q 1/36 280/288.4 |
| 4,365,581 A * | 12/1982 | Margiloff | B60Q 1/36 116/56 |
| 4,575,189 A * | 3/1986 | Johnson | B62J 6/20 280/288.4 |
| 4,948,020 A * | 8/1990 | Smith | B62J 1/28 224/427 |
| 6,250,248 B1 * | 6/2001 | Patera | G09F 17/00 340/984 |
| 8,905,611 B2 | 12/2014 | Connor | |
| 8,907,779 B1 * | 12/2014 | Ross | B62J 50/25 340/471 |
| 11,322,055 B2 * | 5/2022 | Short | G09F 17/00 |
| 2009/0033475 A1 | 2/2009 | Zuziak | |
| 2013/0127638 A1 | 5/2013 | Harrison | |
| 2021/0129932 A1 * | 5/2021 | Keller | B62J 6/26 |

* cited by examiner

*Primary Examiner* — Kevin Hurley
*Assistant Examiner* — Marlon A Arce
(74) *Attorney, Agent, or Firm* — Lawrence J. Gibney

(57) ABSTRACT

Bicycles and automobiles share the roads and it is imperative that a collision between a car and a bicycle be avoided. A warning system that can be placed on the back of a bicycle that extends upward to alert the general traffic in the area. The top portion of the pole will be equipped with a flag or other warning device and will also be illuminated for greater visibility. The warning system can also be extended outward to alert oncoming traffic to a bicycle in the area. When the arm is extended outward it can also rotate backwards if the warning device is struck by an obstacle.

4 Claims, 6 Drawing Sheets

BIKE WARNING SYSTEM

FIELD OF THE INVENTION

This application relates to alerting cars to the presence of a bicycle, which is particularly important on roadways. The warning system will provide sufficient distance so that the bicyclist is not struck. This system can be placed on any bicycle and can be retrofitted to any bicycle without modifying the bicycle.

PRIOR ART

There are other prior art references in the prior art that teach bike warning systems. These references in addition to the present application are designed to alert automobiles about the presence of a bicycle rider to avoid a collision between an automobile and the bicycle rider.

A representative example, which is similar to the current application, can be found at Coutts, U.S. Pat. No. 3,967,575. The Coutts patent teaches a mounted structure that will be attached to the bicycle fender permanently. The device in this application can be moved from bicycle to bicycle without the need to modify the bicycle. The flag in Coutts, however, does not telescope, nor is there any way to illuminate any part of the flag or warning device.

Other references in the prior art include Connor, U.S. Pat. No. 8,905,611, Harrison, U.S. Patent Publication 2013/0127638, and Zuziak, U.S. Patent Publication 20019/0033475.

The Connor reference teaches an illumination means. The Harrison reference teaches a proximity warning system and the Zuziak reference teaches a device to warn a bicyclist of traffic in the area. None of the prior art references are similar to the current application.

BRIEF DESCRIPTION OF THE INVENTION

This is a warning system, which will attach to the post of a bicycle seat. A bracket will be mounted to the post of the bicycle seat and extend toward the rear tire of the bicycle. The bracket will be in the shape of an "L" with an opening in the "L" to mount an assembly.

An assembly will be attached to the bracket probably using a nut and bolt. In this manner the assembly can be moved easily from bicycle to bicycle easily and without modifying the bicycle or the bicycle seat.

The assembly will have a predetermined shape and will have a ninety-degree opening on the side. A pole, which can telescope will be inserted into the ninety-degree opening. The pole can maintain a vertical alignment or can rotate ninety degrees to a horizontal alignment. A top U-bracket and a bottom U-bracket will be placed on the edges of the ninety-degree opening to ensure that the pole maintains the appropriate desired alignment.

On the back surface of the assembly and the side of the assembly another opening is provided. The bottom U-bracket that is on the assembly will rotate ninety degrees to allow the pole to rotate backwards ninety degrees. The bottom U-bracket rotates to allow the pole to be forced backward if needed. The ability to rotate backward is important to prevent the path of the bicycle rider from being impacted to such a degree that the bicycle rider is thrown from the bicycle if the pole strikes an obstruction.

A means to illuminate the top of the pole is also provided to add additional visibility for the bike rider.

NUMBERING REFERENCES

Figure 1:
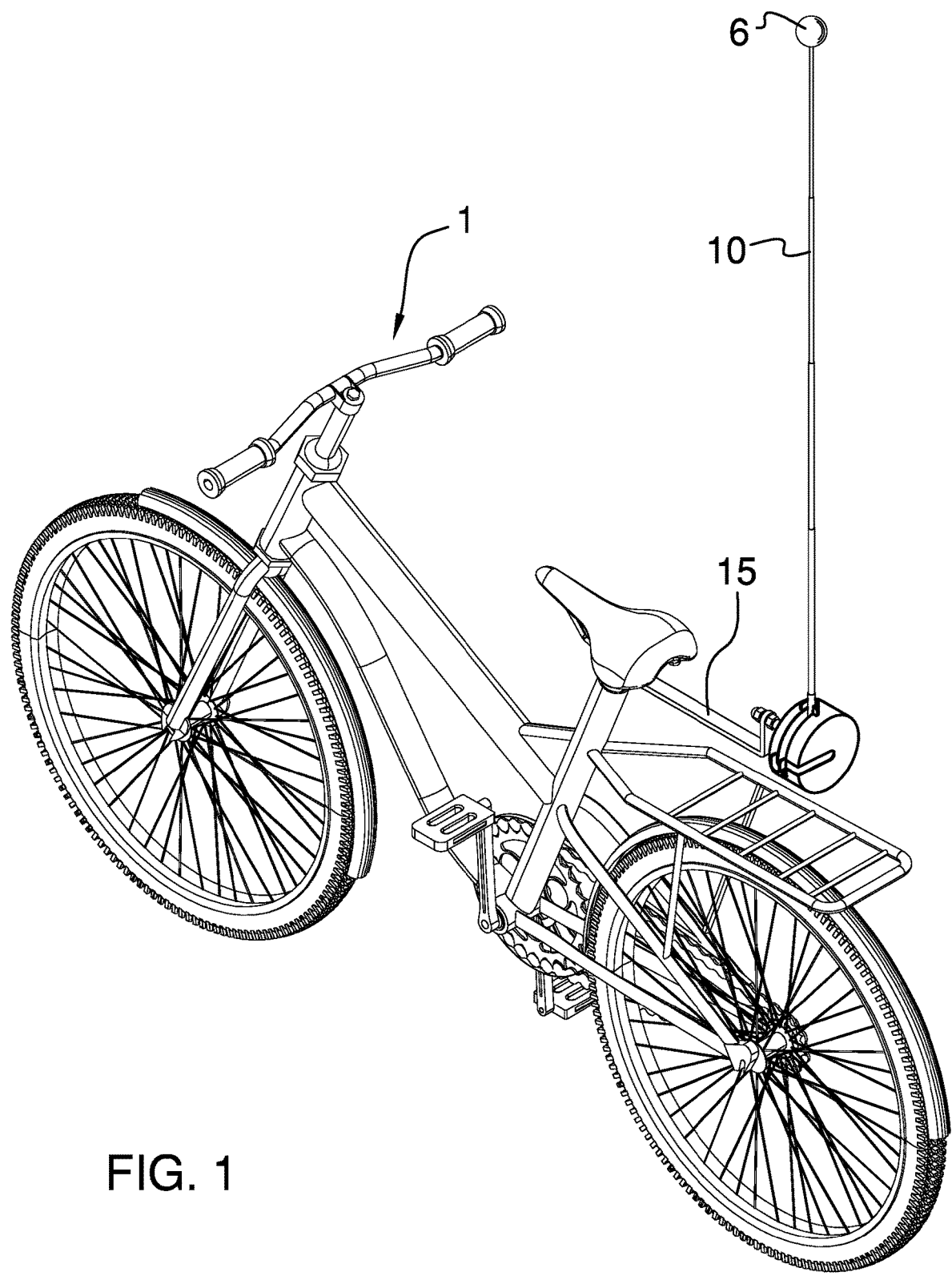
FIG. 1 is an isometric view of the device mounted on a bicycle.

1 Bicycle
5 Warning Device
6 Means of illumination
15 Bracket
20 Top U-bracket
23 First opening on the assembly
25 Bolt
26 Hinge
28 Spring
30 Bottom U-bracket
35 Track for post
40 Assembly
42 Second opening on the assembly

DETAILED DESCRIPTION OF THE EMBODIMENTS

Figure 3:
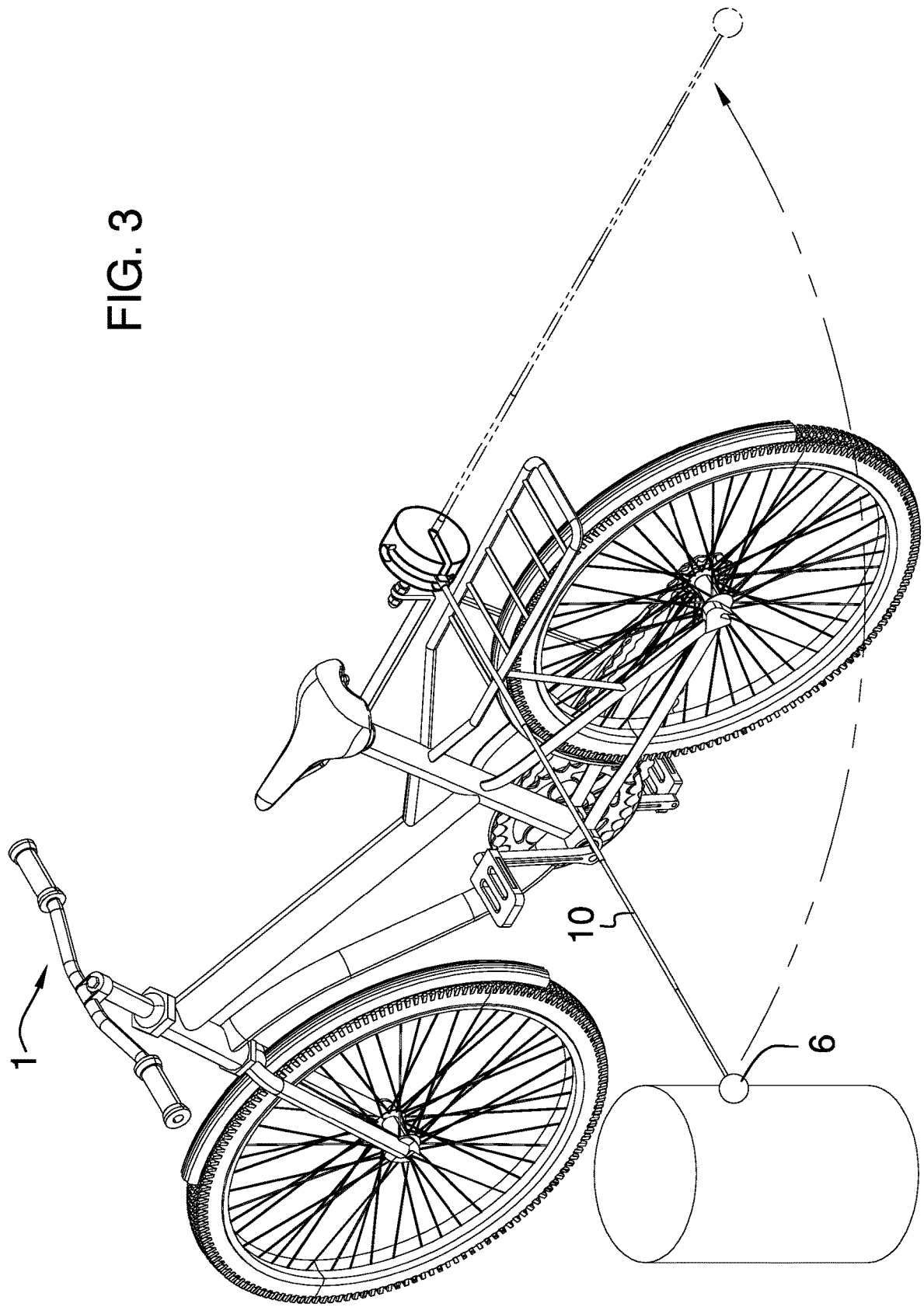
FIG. 3 is an in-use view of the device.
Figure 4:
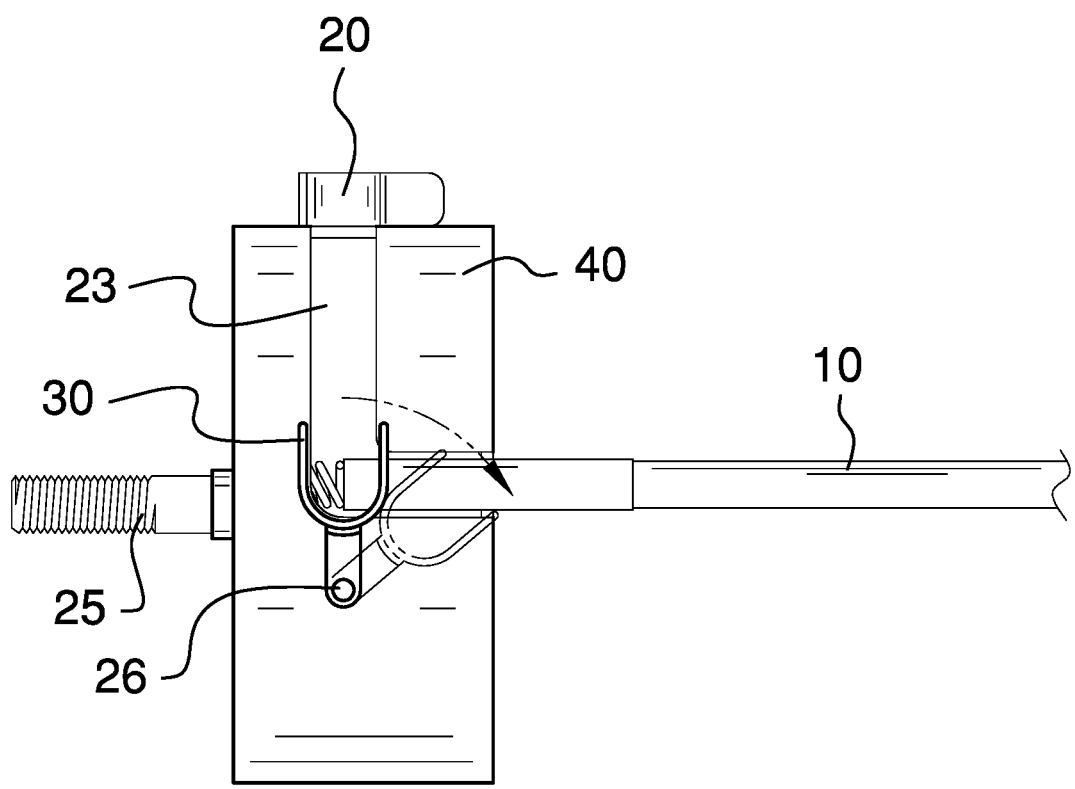
FIG. 4 is a side view of the assembly.
Figure 5:
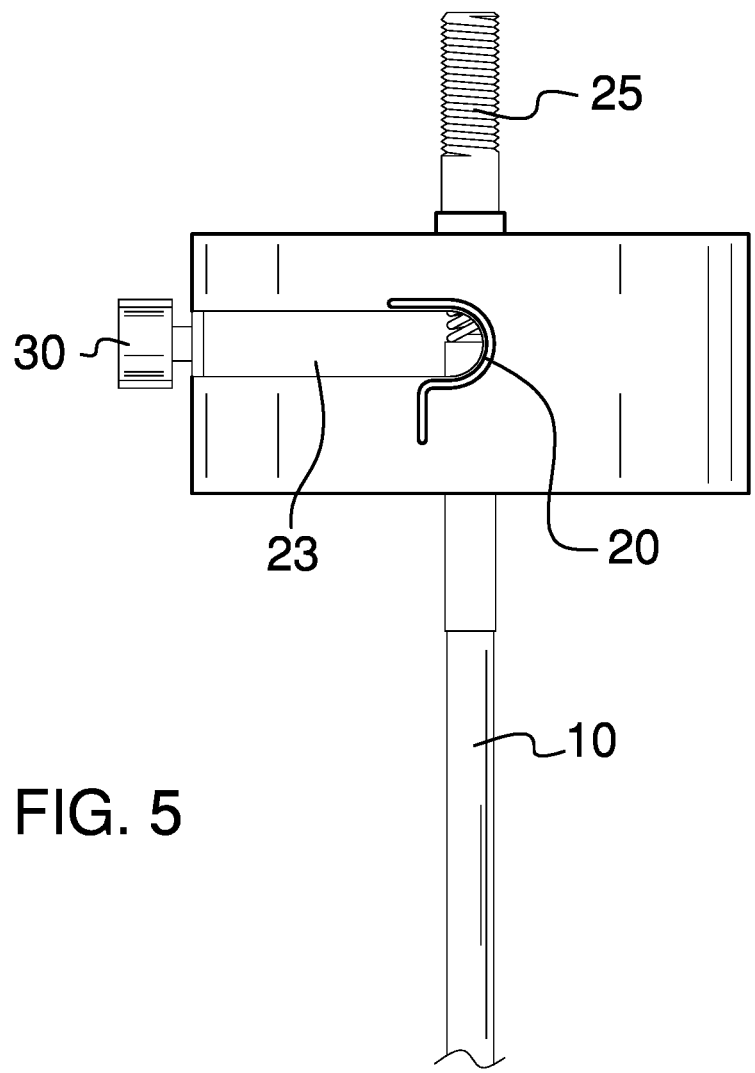
FIG. 5 is a top view of the assembly depicting the pole pointing towards the rear of the bicycle.
Figure 6:
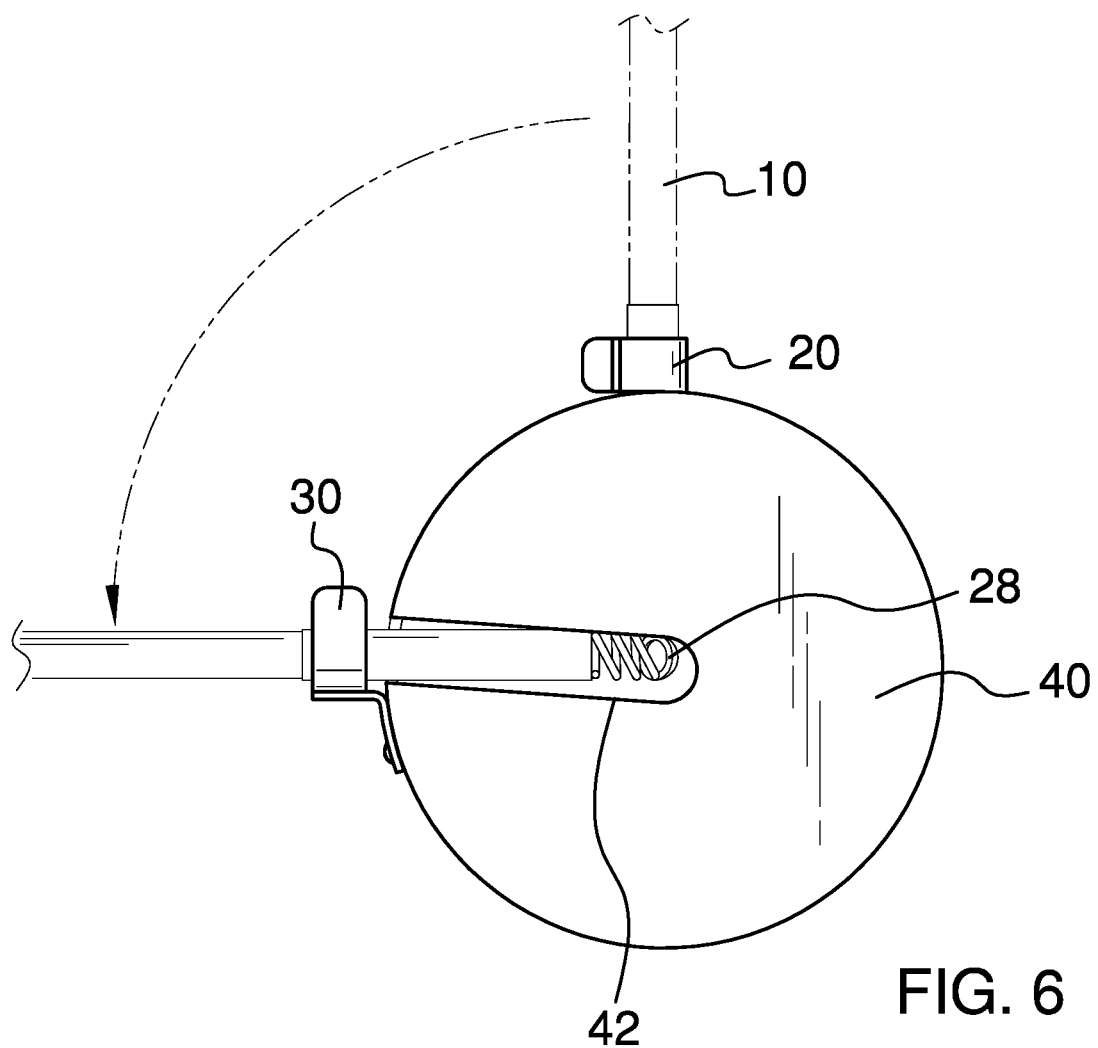
FIG. 6 is a depiction of the device as the pole is rotated 90° from a vertical alignment to a horizontal alignment.

The device will be mounted on the post of the seat of the bicycle, such as depicted in FIGS. 1 and 3. The bicycle 1 is not being claimed, but is integral to this particular application. One end of a bracket 15 will be attached to the seat of a bicycle and will extend backwards a predetermined length into the shape of an "L" with an opening. The assembly 40 will be attached to the bracket using a bolt 25 and nut (not depicted) Other means to attach the assembly may also be contemplated.

Figure 2:
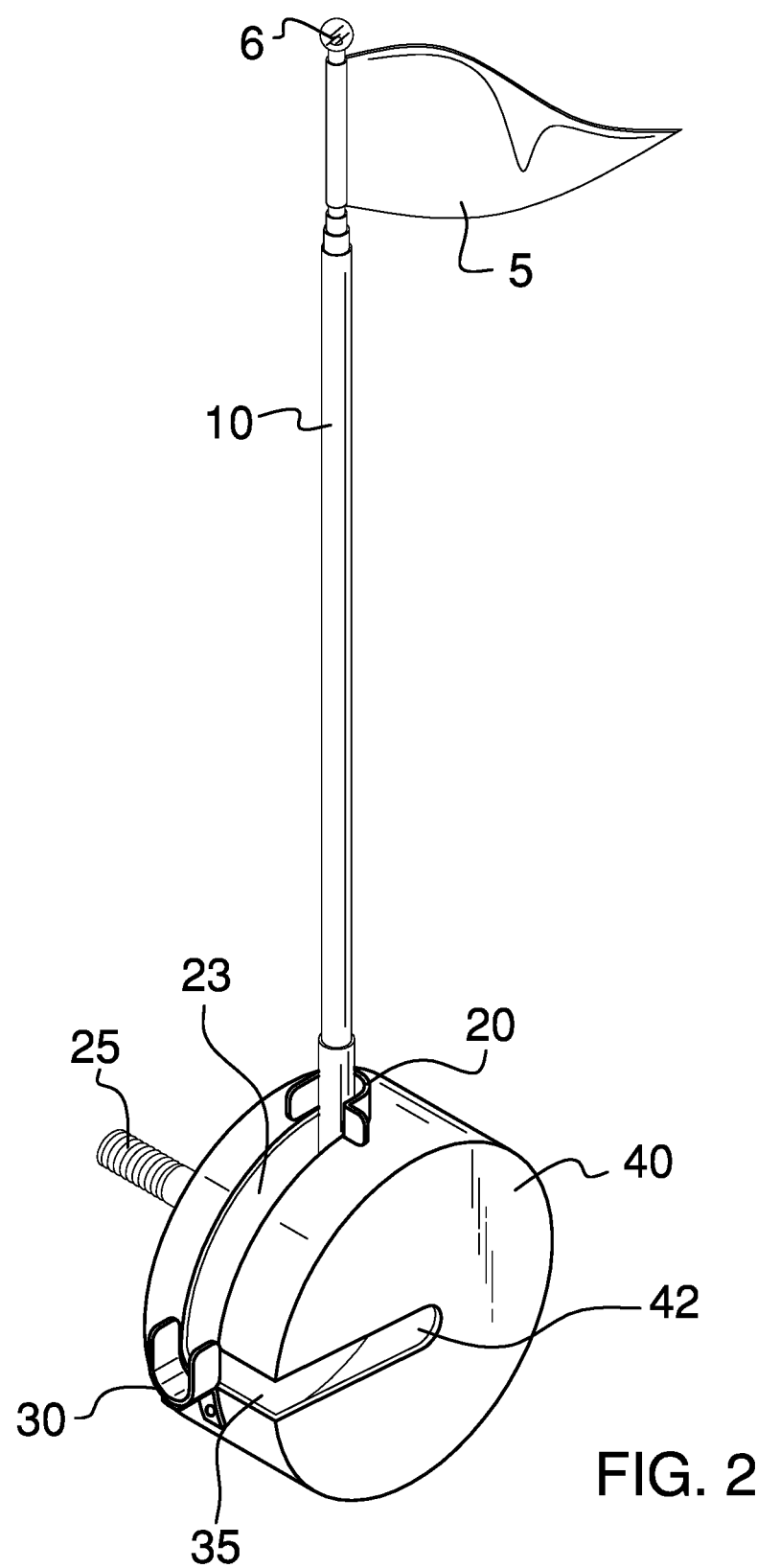
FIG. 2 is an isometric view of the flag warning system assembly.

The assembly 40 will house a pole 10 that telescopes. A spring 28 within the assembly provides sufficient pressure to maintain the position of the pole. At the tip of the pole a warning device 5 and a means of illumination 6 is provided. Examples of warning devices may include a flag such as depicted in FIG. 2 or a ball as examples. The means of illumination 6 may be powered by solar power, battery power or a generator that is attached to the bicycle.

A top U-bracket 20 is provided on the assembly 40 to maintain a vertical alignment of the pole when it is in that position. A first opening 23 in the side of the assembly will allow the pole to travel from a vertical position to a horizontal position, if desired. The first opening 23 will be approximately ninety-degrees. A bottom U-bracket 30 is provided on the first opening 41 of the assembly. The bottom U-bracket will insure that the flag will remain in a horizontal alignment when the pole is positioned in that alignment.

A hinge 26 on the bottom U-bracket 30 will allow the bottom U-bracket to rotate. A second opening 42, which will extend approximately one-half of the diameter of the assembly 40 will permit the pole to rotate from a horizontal position extended perpendicular to the bicycle to a horizontal position pointing behind the bicycle. The opening 42 will provide a track for the pole. In the event that the pole is extended outward in a perpendicular alignment such as depicted in FIG. 3 and strikes an obstruction the pole will rotate backwards to prevent the path of the bicycle rider from being interrupted.

With the use of a bracket on the bicycle this device can be moved from one bicycle to the next without modifying the bicycle.

While the embodiments of the invention have been disclosed, certain modifications may be made by those skilled in the art to modify the invention without departing from the spirit of the invention.

The inventor claims:

1. A bicycle warning system, that is comprised of:
a bracket;
wherein the bracket is mounted to the post on the seat of a bicycle;
wherein the bracket extends a predetermined distance backwards from the bicycle seat;
wherein an opening is provided in the end of the bracket;
an assembly;
wherein an attachment bolt is provided on the assembly;
wherein the assembly has a first opening on the side of the assembly;
wherein the first opening is approximately ninety degrees;
wherein the assembly has a second opening on the back surface of the assembly;
a spring;
wherein the spring is housed in the assembly;
a pole;
wherein the pole has a first end and a second end;
wherein the first end of the pole is contained in the assembly;
a top U-bracket;
wherein the top U-bracket is affixed to the top surface of the assembly;
a bottom U-bracket;
wherein the bottom U-bracket is affixed to the assembly on the side of the assembly;
wherein a hinge is provided on the bottom U-bracket;
a second opening on the assembly;
wherein the second opening extends one half of the diameter of the assembly;
wherein the second opening provides a track for the pole;
wherein the second end of the pole secures a warning device;
wherein the second end of the pole secures the means of illumination.

2. The bicycle warning system that is described in claim 1 wherein the warning device is a ball.

3. The bicycle warning system that is described in claim 1 wherein the warning device is a flag.

4. The bicycle warning system that is described in claim 1 wherein the pole telescopes.

* * * * *